No. 703,233. Patented June 24, 1902.
J. J. BROWN.
APPARATUS FOR SAMPLING GRAIN OR SEED.
(Application filed Feb. 24, 1902.)
(No Model.) 2 Sheets—Sheet 1.
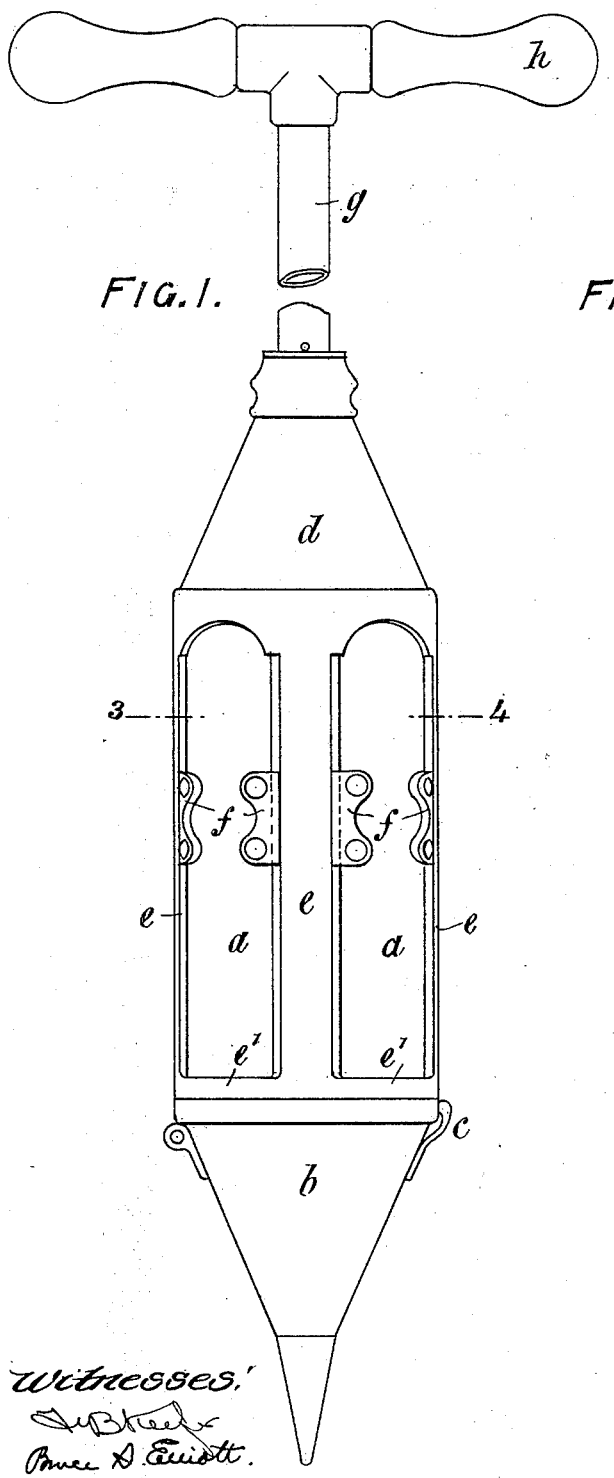
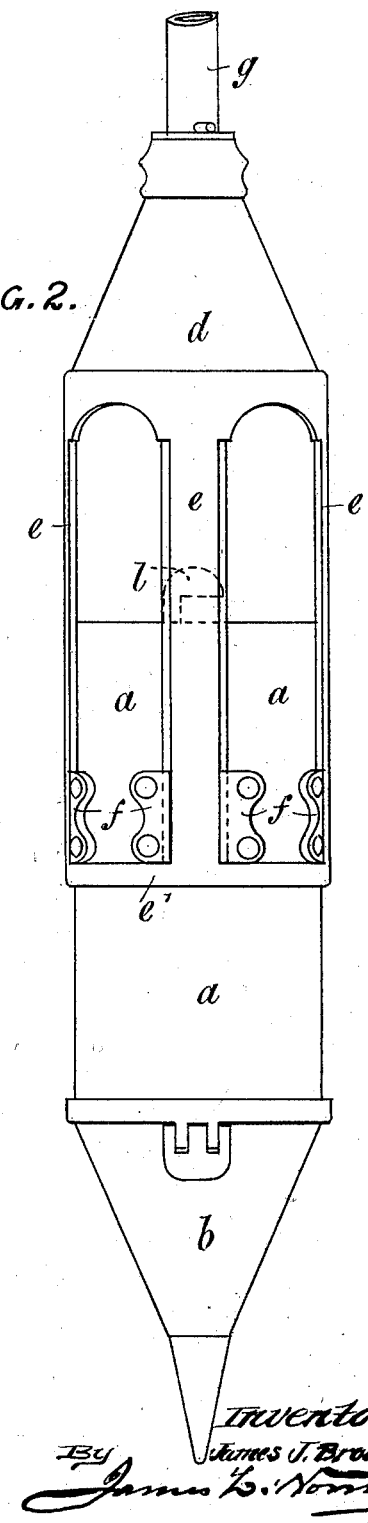

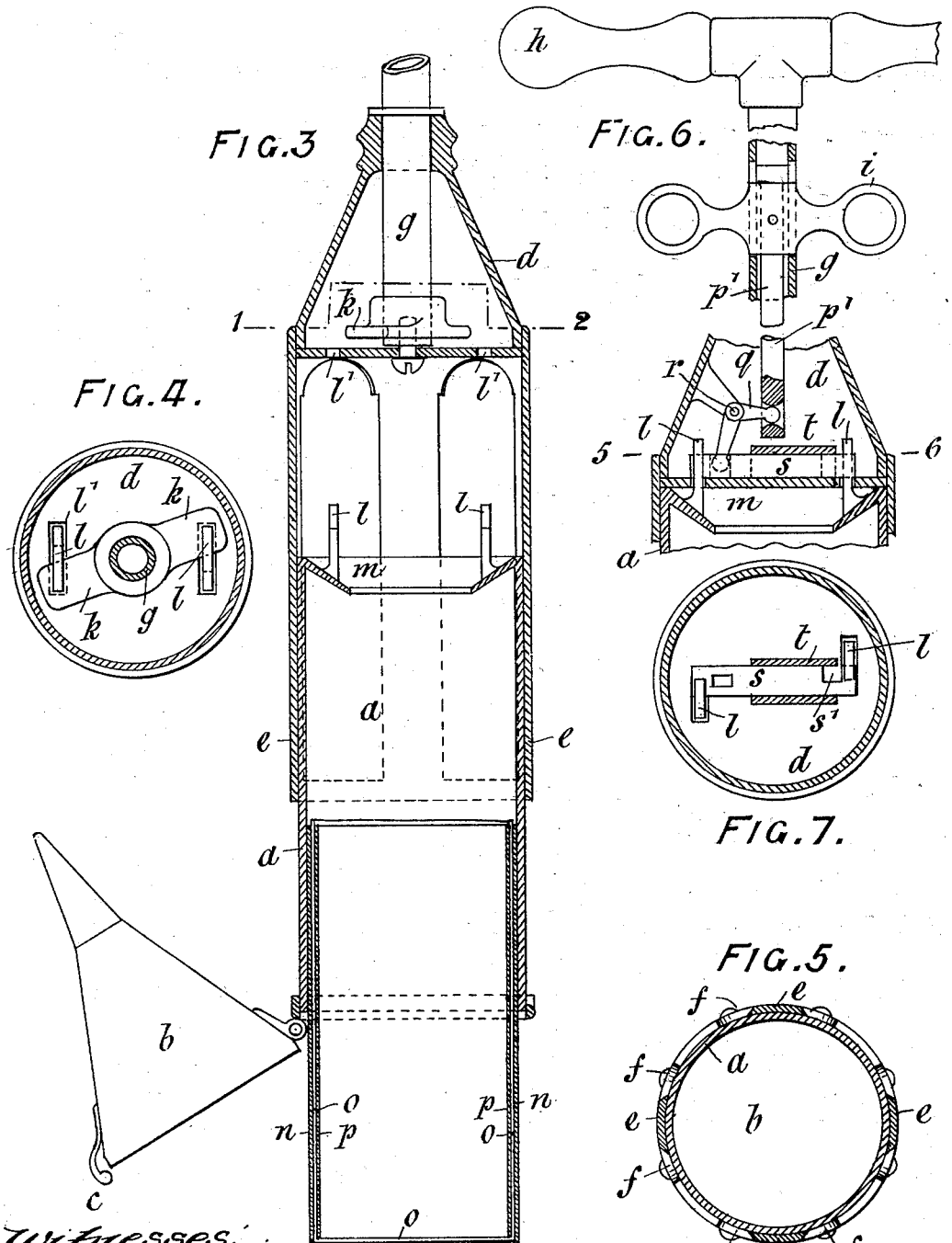

UNITED STATES PATENT OFFICE.

JAMES J. BROWN, OF LONDON, ENGLAND.

APPARATUS FOR SAMPLING GRAIN OR SEED.

SPECIFICATION forming part of Letters Patent No. 703,233, dated June 24, 1902.

Application filed February 24, 1902. Serial No. 95,407. (No model.)

*To all whom it may concern:*

Be it known that I, JAMES JOHN BROWN, principal sampler, Millwall Docks, a subject of the King of Great Britain, residing at 63 Shakespeare Crescent, High street, East Ham, London, England, have invented certain new and useful Improvements in Apparatus for Use in Sampling Grain or Seed, of which the following is a specification.

The object of this invention is to provide a new or improved apparatus by means of which samples of grain and seed may be taken from low down in the bulk and received into a bag or packet ready for sealing and labeling, thereby securing a fair sample of such grain or seed and generally expediting the process of securing, packing, sealing, and labeling the sample.

In the accompanying drawings, Figure 1 is an elevation of the apparatus. Fig. 2 is a similar view of the apparatus open ready to receive the grain or seed. Fig. 3 is a longitudinal vertical section illustrating the action of the various parts. Fig. 4 is a horizontal section of Fig. 3 on the line 1 2. Fig. 5 is a horizontal section of Fig. 1 on the line 3 4. Fig. 6 is a longitudinal vertical section illustrating a modification of the locking mechanism, and Fig. 7 is a horizontal section of Fig. 6 on the line 5 6.

Referring to Figs. 1 to 5, $a$ is a cylindrical case, to the lower end of which is hinged the conical bottom $b$, any suitable spring or other fastening being fitted at $c$ to secure the bottom in position. $d$ is the top or cover, which is fitted with an open tubular extension capable of sliding upon the case $a$, so that the latter telescopes into the former. As shown, the tubular extension is formed by slide-bars $e$ and a rim $e'$, the bars $e$ sliding between guides $f$, secured to the case $a$. Thus when the top $d$ is closed, as in Fig. 1, the case $a$ is impervious to grain or seed; but when the top is raised, as shown in Fig. 2, the grain or seed finds its way through the openings between the bars $e$ above the top edge of the case $a$ into the interior thereof. The top or cover $d$ is secured to a stem or rod $g$, fitted with a handle $h$, the rod $g$ being capable of a limited amount of rotation in said cover $d$. Inside the lid $d$ is fitted a means for locking the same to the case $a$, which can be operated by the handle $h$ or by an auxiliary handle $i$, as in Figs. 6 and 7. The lower end of the stem $g$ where it projects into the cover $d$ is fitted with a cross-bar $k$, capable of engaging hooks $l$, fixed to an inwardly-projecting conical lip $m$ on the case $a$ and which pass through slots $l'$ in the cover, whereby the cover and the case are held together. On twisting the handle to partially revolve the stem $g$ the cross-bar $k$ is disengaged from the hooks $l$, thereby releasing the case and enabling the cover and the case to be pulled apart, subject to the limitations of the guide-shoes $f$ and rim $e'$. The case $a$ is provided with a detachable receptacle $n$, which is arranged to contain the bag or packet $o$, a cylindrical stretcher $p$ being inserted into said bag or packet in order to hold it open to receive the grain or seed. The conical lip $m$ prevents the seed or grain, if minute, from falling between the receptacle $n$ and the case $a$. In ordinary cases the receptacle $n$ fits the case $a$ sufficiently to prevent access of the grain or seed between the receptacle and the case.

In Figs. 6 and 7 a modification of the lid-locking mechanism is shown. The tubular stem $g$ is provided with a rod $p'$, capable of sliding within it. The upper end of said rod $p'$ is fitted to an external handle $i$ and the lower end is arranged to operate a lever $q$, pivoted at $r$ to the conical wall of the cover. $s$ is a bolt capable of sliding within suitable guides or sockets, such as $t$. It will thus be seen that on pulling the external handle $i$ the bolt $s$ is moved into a position whereby the hooks $l$ will pass the bolt, one hook by the receded end of the bolt and the other hook by the recess or notch $s'$.

The action of the apparatus is as follows: A bag $o$ is stretched over the cylindrical stretcher $p$ and inserted into the receptacle $n$, which is then placed in the case $a$ from the lower end and the conical bottom closed and fastened. The apparatus being now completely closed is thrust into the bulk of grain or seed to a depth at which it is desired to obtain a sample, when the cover $d$ is unlocked from the case $a$ and raised sufficiently to allow the grain or seed to flow into the receptacle $n$ inside case $a$. The apparatus is then withdrawn from the grain or seed and the excess removed, the cover being then closed and locked. On unfastening the bottom $b$ the receptacle $n$ is free to slide out of the case $a$, the bag and stretcher being removed therefrom and the latter withdrawn from the former. The bag may then be sealed and labeled.

I claim—

1. In apparatus for obtaining samples of grain or seed, the combination of a case, a cover connected to said case and adapted to be moved longitudinally along said case so as to open and close the upper end thereof, a removable pointed bottom adapted to close the lower end of said case, and a removable receptacle to receive the grain or seed, substantially as set forth.

2. The combination of a case, a cover, slide-bars attached to said cover adapted to slide between guides fixed to said case, a pointed bottom hinged to the lower end of the case, a removable receptacle for the grain or seed, a handle-stem fitted to said cover, and means for locking the case to said cover, substantially as set forth.

3. The combination of a case, an inwardly-projecting conical lip at the upper end of said case, a cover adapted to be moved longitudinally along said case, a handle-stem adapted to partially rotate in said cover, a cross-bar on said stem, hooks attached to said case, a pointed bottom hinged to said case, and a removable grain or seed receptacle, substantially as set forth.

4. The combination with a cover attached to a handle-stem and adapted to be moved longitudinally, a case fitted with a removable pointed bottom and provided with means for locking the case to the cover, of a grain-receptacle adapted to be placed inside said case, a sample-bag, and a cylindrical stretcher adapted to hold open said bag, substantially as set forth.

In testimony whereof I have hereunto set my hand in presence of two subscribing witnesses.

JAMES J. BROWN.

Witnesses:
GEORGE C. DOWNING,
WALTER J. SKERTEN.